Aug. 22, 1933.   J. CHOBERT   1,923,812
TENSIONING DEVICE FOR WIRES, CORDS, OR METAL RODS
Filed Jan. 16, 1933
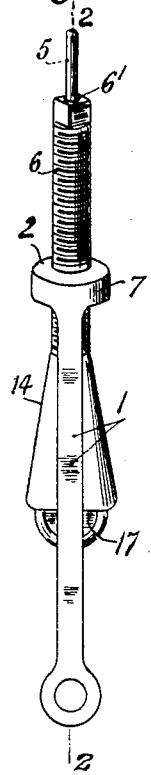 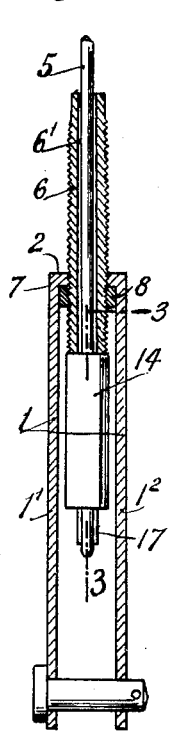 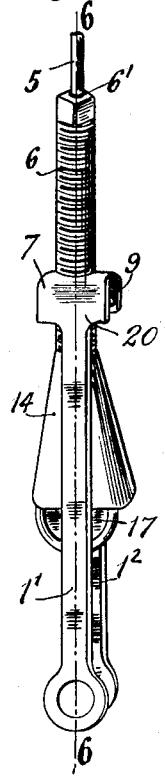 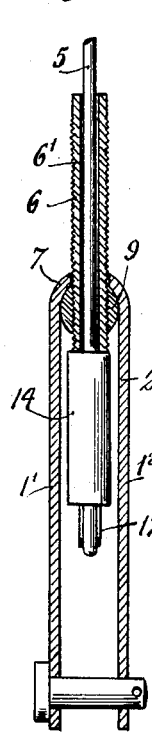 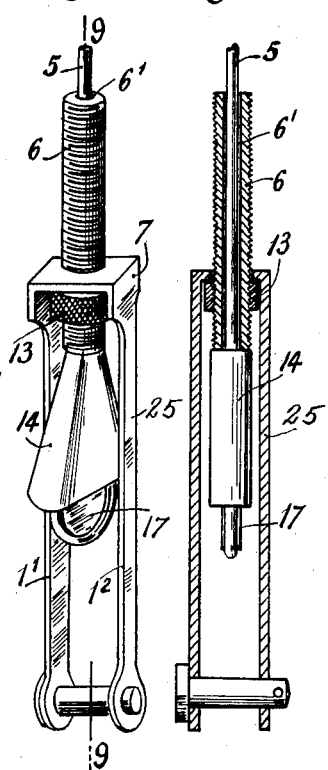 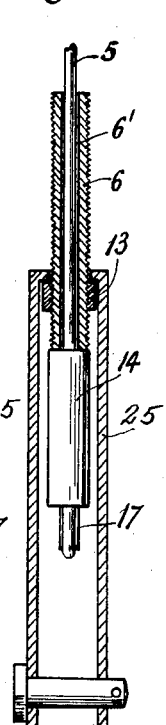
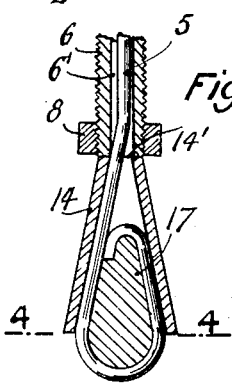 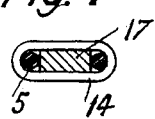 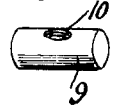 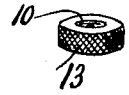
J. Chobert
INVENTOR
By: Marks & Clerk
Attys.

Patented Aug. 22, 1933

1,923,812

UNITED STATES PATENT OFFICE 1,923,812

TENSIONING DEVICE FOR WIRES, CORDS, OR METAL RODS

Jacques Chobert, St.-Etienne, Loire, France

Application January 16, 1933, Serial No. 652,050, and in France January 19, 1932

5 Claims. (Cl. 24—126)

The purpose of the present invention is to reduce as far as possible the vibrations in tensioning and traction members such as cables or rods mounted on board aircraft and the like.

A further object is to diminish the weights of fittings for ensuring the fixing and tensioning of the said cables.

A further object is to ensure the tensioning of these cables such as wires, cords and the like by preventing them from turning on their own axes in such a way as to preserve for them their entire mechanical resistance.

Devices which allow of the practical realization of the foregoing aims are specified by the features set forth in the description below as well as in the claims tabulated at the end of the said description.

Devices conforming to the invention are shown by way of example in the annexed drawing wherein:

Figs. 1 and 2 represent respectively a side view in perspective and a longitudinal section taken on the line 2—2 of Fig. 1 of a device according to the first method of practically realizing the invention.

Fig. 3 is a partial section of the said device taken on the line 3—3 of Fig. 2;

Fig. 4 is a cross section taken on the line 4—4 of Fig. 3;

Figs. 5 and 6 are respectively a side view in perspective and a longitudinal section taken on the line 6—6 of Fig. 5 in a device according to a second practical method of realization;

Fig. 7 is a view in perspective of the driving screw in the device of Figs. 5 and 6;

Figs. 8 and 9 represent respectively a view in perspective and a longitudinal section taken on the line 9—9 of Fig. 8 in a device illustrating a third method of realization;

Fig. 10 is a view in perspective of the driving screw of the system shown in Figs. 8 and 9.

The system represented in Figs. 1–4 comprises essentially a fixing or mooring member 1, a wire securing thimble member 14 for the wire or cable 5 and a tensioning member 6 for the said cable 5.

The fixing or mooring member 1 consists of a frame 1 having two branches $1^1$ $1^2$; this frame is produced by cutting a blank from a thin sheet of steel and by turning over the ends and forming them in such a way as to produce the two branches $1^1$ $1^2$ and the head 2.

A steel washer 8 forming a screw threaded boss is inserted into the head 2 by either a cold or a hot process and the washer after being enclosed in the head 2 cannot rotate about its axis relative to the body of the frame.

A screw threaded sleeve 6 which constitutes the tensioning member is screwed into the screw threaded washer 8.

The tensioning wire 5 passes into the axial channel $6^1$ of the threaded sleeve 6. The extremity of this wire 5 is secured by a tapered thimble 14 bearing on the edge of the threaded sleeve 6 owing to the tension of wire 5. This thimble 14 is lodged between the branches $1^1$ $1^2$ of the body of the frame 1, and, in virtue of its flattened form, can slide between the branches $1^1$ $1^2$ of the said frame 1 without being able to turn relatively thereto.

The thimble 14 comprises a hollow sheath of thin plate of a generally conical form. Within this sheath may be housed a boss 17 in the form of a wedge. The extremity of wire 5 introduced by the opening $14^1$ of the thimble 14 is wound about the boss 17 after the said boss is positioned within the thimble 14; the tension of the wire 5 which is brought about by the advance of the threaded sleeve within the body of the frame 1 produces the jamming of the extremity of wire 5 between the thimble 14 and the boss 17; this boss 17 is itself held firmly at the bottom of the thimble 14 by means of the wire 5 which is wound about the said boss (Fig. 3).

The system thus produced takes up very little room because the thimble is completely housed between the branches $1^1$ $1^2$ of the frame; on the other hand, the division of the weights is arranged for under logical conditions; starting from the point of attachment represented by the frame 1 the next step is by the thimble wire attachment 14, thereafter by the threaded sleeve 6 and thereafter the stretched cord 5 is reached.

This logical distribution also avoids localized vibrations inasmuch as all the heavy pieces are located in the immediate neighbourhood of the point of attachment.

The system thus described may be produced in several different ways and, more particularly, the frame 1 may be produced by cutting a blank from a thin metal band without any threading having to be cut in the metal sheet, and the fixing screw 8 of the threaded sleeve 6 being inserted into the frame body.

In the second method of practical realization corresponding to Figs. 5–7, the body of frame 20 is formed by a cut strip band of sheet metal wound about a steel cylinder 9 (Fig. 7), the said cylinder 9, which forms the screw, being provided for this purpose with a threaded aperture 10.

In the third method of practical realization shown in Figs. 8–10, the system comprises a frame 25 of cut and folded sheet metal, a cylindrical and externally milled screw 13 bears upon the head 2 of the frame, and, by its rotation, effects the advance of the threaded sleeve 6 which, in turn, ensures the tension of the cord 5.

By way of summing up the arrangements thus produced show several advantages among which may be mentioned;

1. The wire securing thimble member is retained from any rotation relatively to the branches of the frame solely by virtue of its generally flattened form and its being located between the branches of the said frame.

2. The wire securing thimble member, although located between the branches of the frame, may be put into position on the extremity of the wire without the necessity of dismantling the anchorage of the branches of the frame.

3. Lastly, the retention of the wire is all the more effectual the greater the pull on the wire.

What I claim as my invention and desire to secure by Letters Patent is:—

1. In a tensioning device for wires, cords or metallic rods, a fixing and mooring member, a hollow tensioning member adjustably mounted within the foregoing fixing member, a stretching wire passing through the hollow tensioning member, a thimble member mounted on the extremity of the stretching wire, the said thimble member being housed in the interior of the fixing member in such a way that it is able to slide within the said member without power to rotate and so that it bears against the tensioning member.

2. In a tensioning device for wires, cords or metallic rods, a fixing and mooring member consisting of a frame having a smooth orifice, a boss inserted within the frame and provided with a threaded opening of a diameter smaller than that of the opening of the body of frame, a sleeve threaded externally and screwed into the inserted boss, means provided on the threaded sleeve to ensure its rotation, a stretching wire or cord passing through the channel of the threaded sleeve, a thimble member mounted on the extremity of the stretching wire, the said thimble member being housed in the interior of the fixing member and bearing against the inner edge of the threaded sleeve.

3. In a tensioning device for wires, cords or metallic rods, a fixing and mooring member consisting of a frame having a smooth aperture, a boss inserted into the body of the frame so as to be incapable of rotating relatively to the said frame body, this boss being provided with a threaded orifice of a diameter smaller than that of the orifice of the frame body, a sleeve threaded externally and screwed into the inserted boss, means provided on the threaded sleeve to ensure its rotation, a stretching wire or cord passing through the channel of the threaded sleeve, a thimble member mounted on the extremity of the stretching wire, the said thimble member being housed in the interior of the fixing member and bearing against the inner edge of the threaded sleeve.

4. In a tensioning device for wires, cords or metallic rods, a fixing and mooring member consisting of a frame having a smooth orifice, a boss inserted into the body of the frame, the said boss having at one extremity, a threaded orifice of a diameter smaller than that of the orifice of the body of the frame, and at the other extremity, means adapted to make the said boss rotate, a sleeve threaded externally and screwed into the inserted boss, a stretching wire or cord passing through the channel of the threaded sleeve, a thimble member mounted on the extremity of the stretching wire, the said thimble member being housed in the interior of the fixing member and bearing against the inner edge of the threaded sleeve.

5. In a tensioning device for wires, cords or metallic rods, a fixing and mooring member, a hollow tensioning member adjustably mounted within the foregoing fixing member, a stretching wire passing through the hollow tensioning member, a hollow thimble fitted to the extremity of wire, the said thimble being located within the fixing member and bearing against the tensioning member, a wedge serving thereon to wind the end of the wire and engaging within the hollow thimble so as to secure the wire thereto.

JACQUES CHOBERT.